United States Patent
Santra et al.

(10) Patent No.: US 7,854,262 B2
(45) Date of Patent: Dec. 21, 2010

(54) SOREL CEMENT COMPOSITIONS, AMINE PHOSPHONO RETARDERS, AND ASSOCIATED METHODS

(75) Inventors: Ashok K. Santra, Duncan, OK (US); Rocky Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 73 days.

(21) Appl. No.: 12/287,775

(22) Filed: Oct. 14, 2008

(65) Prior Publication Data

US 2010/0089582 A1    Apr. 15, 2010

(51) Int. Cl.
*E21B 33/138*    (2006.01)
*C04B 9/02*    (2006.01)

(52) U.S. Cl. .................... 166/293; 106/685
(58) Field of Classification Search ................. None
See application file for complete search history.

(56) References Cited

U.S. PATENT DOCUMENTS

| | | | |
|---|---|---|---|
| 4,352,694 A * | 10/1982 | Smith-Johannsen | 106/685 |
| 4,582,139 A | 4/1986 | Childs et al. | |
| 4,676,832 A | 6/1987 | Childs et al. | |
| 5,079,277 A * | 1/1992 | Wilson et al. | 523/116 |
| 5,213,161 A | 5/1993 | King et al. | |
| 5,238,064 A | 8/1993 | Dahl et al. | |
| 5,264,470 A | 11/1993 | Eoff | |
| 5,346,012 A | 9/1994 | Heathman et al. | |
| 5,355,955 A | 10/1994 | Rodrigues et al. | |
| 5,379,840 A | 1/1995 | Cowan et al. | |
| 5,398,759 A | 3/1995 | Rodrigues et al. | |
| 5,913,364 A | 6/1999 | Sweatman | |
| 6,167,967 B1 | 1/2001 | Sweatman | |
| 6,258,757 B1 | 7/2001 | Sweatman et al. | |
| 6,664,215 B1 | 12/2003 | Tomlinson | |
| 6,978,835 B1 | 12/2005 | Reddy et al. | |
| 7,004,256 B1 | 2/2006 | Chatterji et al. | |
| 7,044,222 B2 | 5/2006 | Tomlinson | |
| 7,244,303 B2 | 7/2007 | Chatterji et al. | |
| 7,328,756 B2 | 2/2008 | Reddy et al. | |
| 7,350,575 B1 | 4/2008 | Lewis et al. | |
| 7,350,576 B2 | 4/2008 | Robertson et al. | |
| 2005/0155763 A1 | 7/2005 | Reddy et al. | |
| 2005/0155795 A1 | 7/2005 | Reddy et al. | |
| 2006/0131019 A1 | 6/2006 | Santra et al. | |
| 2008/0023200 A1 | 1/2008 | Reddy et al. | |
| 2008/0105428 A1 | 5/2008 | Santra et al. | |
| 2010/0006288 A1 | 1/2010 | Santra et al. | |

FOREIGN PATENT DOCUMENTS

| | | |
|---|---|---|
| EP | 177308 A2 * | 4/1986 |
| EP | 0582367 | 2/1994 |
| WO | WO 2008/084193 | 7/2008 |

OTHER PUBLICATIONS

Halliburton Technology Bulletin Entitled "Thermatek Services" dated Apr. 9, 2004.
Material Safety Data Sheet for Dequest 2006 dated Nov. 30, 2007.
Material Safety Data Sheet for Dequest 2054 dated Nov. 30, 2007.
Halliburton Brochure entitled "Microbond HT Cement Additive" dated Aug. 2007.
Material Safety Data Sheet for R-Tek dated Feb. 6, 2004.
Material Safety Data Sheet for C-Tek dated Jan. 7, 2004.
Material Safety Data Sheet for Thermatek-HT dated Jun. 2, 2007.
Material Safety Data Sheet for Thermatek-LT dated Jun. 2, 2007.
International Search Report for PCT/GB2009/002262 dated Feb. 17, 2010.
International Search Report for PCT/GB2007/005007 dated Jun. 27, 2008.

* cited by examiner

*Primary Examiner*—Zakiya W. Bates
(74) *Attorney, Agent, or Firm*—Robert A. Kent; McDermott Will & Emery LLP

(57) ABSTRACT

Methods of cementing comprising introducing a cement composition into a subterranean formation, wherein the cement composition comprises a Sorel cement and an amine phosphono retarder; and allowing the cement composition to set.

20 Claims, No Drawings

SOREL CEMENT COMPOSITIONS, AMINE PHOSPHONO RETARDERS, AND ASSOCIATED METHODS

BACKGROUND

The present invention relates to cement compositions and, more particularly, in certain embodiments, to amine phosphono retarder compositions for retarding Sorel cements and associated methods.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. One type of cement composition is a Sorel cement composition.

These subterranean applications operations generally occur under a wide variety of well bore conditions, for example, ranging from shallow wells (less than about 1,000 feet) to extremely deep wells (greater than about 35,000 feet). Generally, the cement composition should remain in a pumpable state until the cement composition has been placed into the desired location. To retard the set time of Portland cement compositions, set retarder compositions have been included therein. As used herein, the phrase set retarder compositions refers to a wide variety of compositions commonly used in cementing operations for delaying the set time of a cement composition, including lignosulfates, hydroxycarboxy acids, phosphonic acid derivatives, synthetic polymers (e.g., copolymers of 2-acrylamido-2-methylpropane sulfonic acid ("AMPS")), borate salts, and combinations thereof.

Because of the difference in chemistry between Sorel cements and Portland cement, set retarder compositions suitable for use in Portland cements may not perform as desired in Sorel cements. For example, certain types of these set retarder compositions do not perform well with Sorel cements at high temperatures. Furthermore, Sorel cements are generally more susceptible to high temperatures than Portland cement compositions. Thus the use of Sorel cements is often limited to subterranean applications with temperatures not exceeding of 240° F.

SUMMARY

The present invention relates to cement compositions and, more particularly, in certain embodiments, to amine phosphono compositions for retarding Sorel cements and associated methods.

In one embodiment, the present invention comprises a method of cementing comprising introducing a cement composition into a subterranean formation, wherein the cement composition comprises a Sorel cement and an amine phosphono retarder, and allowing the cement composition to set.

In another embodiment, the present invention comprises a method of retarding a set time of a cement composition comprising adding an amine phosphono retarder to a cement composition that comprises a Sorel cement.

In another embodiment, the present invention comprises a cement composition comprising a Sorel cement and an amine phosphono retarder.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cement compositions and, more particularly, in certain embodiments, to amine phosphono retarder compositions for retarding Sorel cements and associated methods. There may be several potential advantages to the methods and compositions of the present invention, only some of which may be alluded to herein. One of the many potential advantages of the methods and compositions of the present invention may be that the embodiments of the retarder compositions may allow the use of Sorel cements in subterranean applications with temperatures up to at least about 400° F.

An example of a cement composition of the present invention generally may comprise a Sorel cement and an amine phosphono retarder. As used herein, the term "amine phosphono retarder" refers to any compound for retarding the setting of a Sorel cement that comprises an amine phosphonic acid or an amine phosphonate group. Those of ordinary skill in the art will appreciate that the cement compositions generally should have a density suitable for a particular application. By way of example, the cement composition may have a density in the range of from about 4 pounds per gallon ("lb/gal") to about 22 lb/gal. In certain embodiments, the cement compositions may have a density in the range of from about 8 lb/gal to about 15 lb/gal. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Any Sorel cement suitable for use in subterranean applications may be suitable for use in the present invention. In various embodiments, Sorel cements may comprise a metal oxide and a soluble salt, and water. Embodiments of the Sorel cements may have, for a given porosity, better mechanical strengths than ordinary Portland cements. Moreover, the bonding mechanism in Sorel cements should be similar to that of gypsum cement. Sorel cements also may have a desirable adhesion to salt (e.g., sodium chloride).

In some embodiments, the Sorel cement may comprise the metal oxide in an amount in the range of about 10% to about 75% by weight of the Sorel cement (e.g., the combined weight of metal oxide and the soluble salt). In some embodiments, the Sorel cement may comprise the metal oxide in an amount in the range of about 20% to about 65% by weight of the Sorel cement. In some embodiments, the Sorel cement may comprise the metal oxide in an amount in the range of about 35% to about 50% by weight of the Sorel cement (e.g., the combined weight of metal oxide and the soluble salt). In some embodiments, the Sorel cement may comprise the soluble salt in an amount in the range of about 25% to about 90% by weight of the Sorel cement. In some embodiments, the Sorel cement may comprise the soluble salt in an amount in the range of about 35% to about 80% by weight of the Sorel cement. In some embodiments, the Sorel cement may comprise the soluble salt in an amount in the range of about 50% to about 65% by weight of the Sorel cement.

In some embodiment, the metal oxide may comprise an alkaline earth metal oxide. One example of suitable metal oxide comprises magnesium oxide (MgO). In some embodiments, the MgO for use in a Sorel cement comprises hard-burned MgO, light-burned MgO, dead-burned MgO, or combinations thereof. MgO may be prepared by calcination of $Mg(OH)_2$ as depicted in Reaction 1:

(Reaction 1)

$$Mg(OH)_2 \xrightarrow{heat} MgO + H_2O$$

The calcination of $Mg(OH)_2$ should result in what is commonly referred to as "burned" MgO. Three basic grades of burned MgO may be produced with the differences between each grade related to the degree of reactivity remaining after being exposed to a range of high temperatures. The original magnesium hydroxide particle usually may be a large and loosely bonded particle. Exposure to thermal degradation by calcination should cause the $Mg(OH)_2$ to alter its structure so that the surface pores are slowly filled in while the particle edges become more rounded. This should result in MgO with varying degrees of crystallinity and consequently varying degrees of reactivity. When the MgO is produced by calcining to temperatures of about 1500° C. to about 2000° C., the MgO is referred to as "dead-burned" since the majority of the reactivity has been eliminated. Dead-burned MgO has the highest degree of crystallinity of the three grades of burned MgO. An example of a suitable dead-burned MgO includes without limitation "THERMATEK™ HT" additive, which is available from Halliburton Energy Services. A second type of MgO produced by calcining at temperatures of about 1000° C. to about 1500° C. is termed "hard-burned" and displays an intermediate crystallinity and reactivity when compared to the other two grades of burned MgO. An example of a suitable hard-burned MgO includes without limitation "THERMATEK™ LT" additive which is available from Halliburton Energy Services. The third grade of MgO is produced by calcining at temperatures of about 700° C. to about 1000° C. and is termed "light-burned" or "caustic" magnesia. Light-burned MgO is characterized by a high surface area, a low crystallinity and a high degree of reactivity when compared to the other grades of burned MgO.

As set forth above, embodiments of the Sorel cement comprise a soluble salt. In some embodiments, the soluble salt may comprise a chloride salt, a phosphate salt, or combinations thereof. In some embodiments, the soluble salt may comprise an alkaline earth metal chloride. In some embodiments, the soluble salt may comprise magnesium chloride ($MgCl_2$), magnesium chloride hexahydrate ($MgCl_2.6H_2O$), or combinations thereof. An example of suitable $MgCl_2.6H_2O$ includes without limitation C-TEK available from Halliburton Energy Services.

One example of a suitable Sorel cement comprises MgO, $MgCl_2$, and water. In certain embodiment, an example of a suitable Sorel cement may be made by mixing powdered magnesium oxide with a concentrated solution of magnesium chloride. Dissolution of MgO in the $MgCl_2$ solution leads to formation of a gel (setting) and occurs before the crystallization of the other hydrates takes place. Setting of the Sorel cement comprising MgO and $MgCl_2$ should result in phases including, but not limited to, $Mg_3(OH)_5Cl.4H_2O$ and $Mg_2(OH)_3Cl.4H_2O$. With atmospheric $CO_2$ attack, $Mg_2OHClCO_3.H_2O$ and $Mg_5(OH)_2(CO_3)_4.4H_2O$ should also be formed, these compounds are insoluble in water and should enable the Sorel cement to maintain structural integrity.

The chemical reaction of MgO and $MgCl_2$ is affected by the quality of the MgO, which may be produced by consistent, adequate burning, in certain embodiments. Under burning may produce an excessively reactive product and over burning may produce an insufficiently reactive material. The hydration reactions of MgO and $MgCl_2$ are complex and generally may be represented basically as follows:

$$5MgO+MgCl_2+13H_2O \rightarrow 2\{Mg_3(OH)_5Cl.4H_2O\}$$

$$3MgO+MgCl_2+11H_2O \rightarrow 2\{Mg_2(OH)_3Cl.4H_2O\}$$

$$3MgO+MgCl_2+2CO_2+7H_2O \rightarrow 2\{Mg_2(OH)_3Cl.4H_2O\}$$

$$5MgO+4CO_2+5H_2O \rightarrow Mg_5(OH)_2(CO_3)_4.4H_2O$$

$$Mg_3(OH)_5Cl.4H_2O+2CO_2 \rightarrow Mg_2OHClCO_3.3H_2O+MgCO_3+3H_2O$$

$$MgO+MgCl_2+2MgCO_3+7H_2O \rightarrow 2Mg_2OHClCO_3.3H_2O$$

$$Mg_2(OH)_3Cl.4H_2O+CO_2 \rightarrow Mg_2OHClCO_3.3H_2O+2H_2O$$

$$MgO+4MgCO_3+5H_2O \rightarrow Mg_5(OH)_2(CO_3)_4.4H_2O$$

Another example of a suitable Sorel cement comprises MgO, $MgCl_2.6H_2O$, and water. In certain embodiments, the Sorel cement may comprise MgO and $MgCl_2.6H_2O$ present in a ratio of from about 2:1 $MgO:MgCl_2.6H_2O$, alternatively from about 1.5:1 $MgO:MgCl_2.6H_2O$ and, alternatively from about 1:1 $MgO:MgCl_2.6H_2O$. Examples of Sorel cements comprising MgO include without limitation "THERMATEK™" rigid setting fluids available from Halliburton Energy Services.

Another example of a suitable Sorel cement comprises MgO, a phosphate salt, and water. In certain embodiments, a Sorel cement may comprise MgO and a phosphate salt, such as for example potassium dihydrogen phosphate, sodium dihydrogen phosphate, ammonium dihydrogen phosphate or combinations thereof. In certain embodiments, the ratio of MgO:phosphate salt may be from about 1:4 alternatively from about 1:3, alternatively from about 1:2, alternatively from about 1:1.

In addition to mixtures of a metal oxide and a soluble salt, Sorel cements may also include $MgCl_2$, calcium sulfates or calcium phosphate-sulfate mixtures, and water. In certain embodiments, a suitable Sorel cement may be produced by adding magnesium chloride solutions to calcium sulfates or calcium phosphate-sulfate mixtures. The phosphates, where present, should improve the Theological properties of the cement pastes and their water resistance.

Another example of a suitable Sorel cement comprises MgO, sulfuric acid, and water. Setting of the Sorel cement comprising MgO and sulfuric acid should result in phases, depending upon the temperature and pressure conditions, that include, but are not limited to:

$3Mg(OH)_2 \cdot MgSO_4 \cdot 8H_2O$
$5Mg(OH)_2 \cdot MgSO_4 \cdot 3H_2O$
$Mg(OH)_2 \cdot MgSO_4 \cdot 5H_2O$
$Mg(OH)_2 \cdot 2MgSO_4 \cdot 3H_2O$
$2Mg(OH)_2 \cdot 3MgSO_4 \cdot 5H_2O$
$MgSO_4 \cdot H_2SO_4 \cdot 3H_2O$
$3Mg(OH)_2 \cdot MgSO_4 \cdot 4H_2O$ The water utilized in embodiments of the Sorel cements may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, in some embodiments, the water may be present in an amount sufficient to form a pumpable slurry. In certain embodiments, the water is present in the Sorel cement in an amount in the range of about 10% to about 200% by weight of the metal oxide and soluble salt therein. In certain embodiments, the water is present in the Sorel cement in the range of about 50% to about 180% by weight of the metal oxide and soluble salt therein. In certain embodiments, the water is present in the cement composition in the range of about 30% to about 70% by weight of the metal oxide and soluble salt therein. One of ordinary skill in the art with the benefit of this disclosure will recognize the appropriate amount of water for a chosen application.

In some embodiments, the cement compositions of the present invention may comprise an amine phosphono retarder. Suitable amine phosphono retarders may include an amine phosphonic acid, a salt of an amine phosphonic acid, a poly vinyl phosphonate, and any derivative thereof. In some embodiments, the amine phosphono retarder may be a compound comprising at least one of the following formulas:

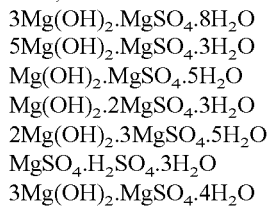

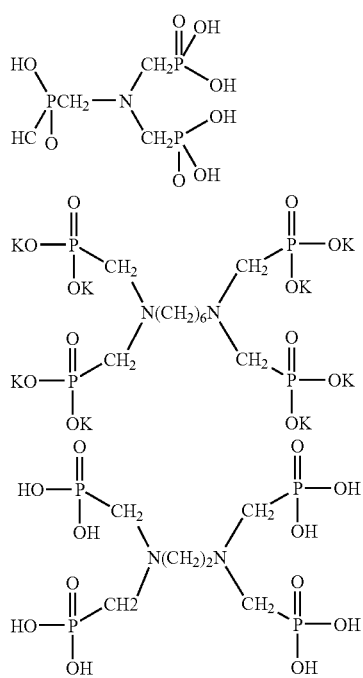

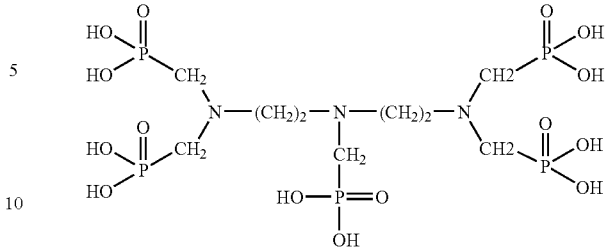

Examples of suitable amine phosphono retarders include without limitation "DEQUEST® 2054" and "DEQUEST® 2006" available from Thermphos Trading Gmbh. In some embodiments, the amine phosphono retarders may be present in the cement composition in an amount of from about 0.25% to about 20% based on the weight of the Sorel cement (e.g., the combined weight of metal oxide and the soluble salt), alternatively of from about 0.5% to about 10%, alternatively of from about 1% to about 7%. By the use of an amine phosphono retarder, the thickening time of the cement compositions of the present invention may be adjusted such that the composition remains pumpable during downhole placement before rapidly setting. The thickening time refers to the time required for the cement composition to achieve 70 Bearden units of Consistency (Bc), as described in API Recommended Practice for Testing Well Cements 10B, 23rd edition, April 2002. At about 70 Bc, the slurry undergoes a conversion from a pumpable fluid state to a non-pumpable paste.

Other suitable amine phosphono retarders may include polymers or oligomers formed from at least one of the amine phosphono retarders described above. In addition, suitable amine phosphono retarders may also include any base polymer with hanging phosphonate groups such as $\{—CH_2—CHN(CH_2PO(OH)_2)_2—\}_x$ and $\{—CH_2—CH_2NCH2PO(OH)_2—\}_x$. Examples of suitable base polymers with hanging phosphonate groups may include poly vinyl phosphonate.

In some embodiments, the cement compositions of the present invention may comprise a surfactant, such as an organophilic surfactant. Examples of suitable organophilic surfactants include without limitation compounds that comprise a $C_{16}$ or greater fatty acid moiety, a quaternary amide, a quaternary amide ester, or a combination thereof. The surfactant may function to render the Sorel cement organophilic and therefore compatible with an oleaginous fluid of the type disclosed herein. In some embodiments, the surfactant may be present in an amount of from about 0.25% to about 5% based on the weight of the Sorel cement, alternatively of from about 0.50% to about 5%, alternatively of from about 1% to about 5%.

In some embodiments, the cement compositions may comprise an oleaginous fluid. Examples of oleaginous fluids suitable for use in embodiments of the present invention include without limitation natural oil based muds (OBM), synthetic based muds (SBM), natural base oils, synthetic base oils and invert emulsions. OBMs and SBMs typically contain some non-oleaginous fluid such as water, making them water-in-oil type emulsions, also known as invert emulsions wherein a non-oleaginous fluid (e.g., water) comprises the internal phase and an oleaginous fluid comprises the external phase. The non-oleaginous fluid (e.g., water) may arise from a drilling fluid itself or from the well bore, or it may be intentionally added to affect the properties of the cement composition. Any known oleaginous fluid may be used to form the external oil phase of the invert emulsion fluid. In addition, any known non-oleaginous fluid may be used to form the internal phase of the invert emulsion fluid.

In some embodiments, the cement compositions of the present invention may comprise a Sorel cement and an oleaginous fluid in a ratio of from about 95:5 Sorel cement: oleaginous fluid by weight, alternatively from about 75:25 Sorel cement:oleaginous fluid by weight, alternatively from about 25:75 Sorel cement:oleaginous fluid by weight, alternatively from about 50:50 Sorel cement:oleaginous fluid by weight.

Optionally, other additional additives may be added to the cement compositions of the present invention as deemed appropriate by one skilled in the art, with the benefit of this disclosure. Examples of such additives include, but are not limited to, weight reducing additives, heavyweight additives, lost circulation materials, filtration control additives, dispersants, suspending agents, and combinations thereof. Suitable examples of these additives include crystalline silica compounds, amorphous silica, salts, fibers, hydratable clays, microspheres, pozzolan additives, latex cement, thixotropic additives, combinations thereof and the like.

As will be appreciated by those of ordinary skill in the art, with the benefit of this disclosure, embodiments of the cement compositions of the present invention may be used in a variety of subterranean applications, including, but not limited to, primary cementing and remedial cementing. For example, in primary cementing applications, the cement compositions may be introduced into an annulus between a pipe string located in a subterranean formation and the subterranean formation and allowed to set therein. In addition, in remedial cementing applications, the cement compositions may be used, for example, in squeeze cementing operations or in the placement of cement plugs. For example, the cement compositions may be used to plug a void or crack in a conduit in a well bore; to plug a void or crack in a cement sheath disposed in an annulus of the well bore; to plug an opening between the cement sheath and a conduit; to prevent the loss of aqueous or non-aqueous drilling fluids into loss circulation zones such as a void, vugular zone, or fracture; to be used as a fluid in front of cement slurry in cementing operations; to seal an annulus between the well bore and an expandable pipe or pipe string; or combinations thereof.

In one embodiment, a cement composition of the present invention may be introduced to the well bore to prevent the loss of aqueous or non-aqueous drilling fluids into loss-circulation zones such as voids, vugular zones, and natural or induced fractures while drilling. The cement composition of the present invention may form a non-flowing, intact mass inside the loss-circulation zone which plugs the zone and inhibits loss of subsequently pumped drilling fluid, which allows for further drilling. For example, the cement composition may function as a plug that is placed into an annulus of the well bore and prepares the formation for placement of a second (e.g. cementitious) composition.

Alternatively, a cement composition of the present invention when placed in a well bore may be allowed to set such that it isolates the subterranean formation from a different portion of the well bore. The cement composition thus forms a barrier that prevents fluids in that subterranean formation from migrating into other subterranean formations. In an embodiment, the well bore in which the composition is positioned belongs to a multilateral well bore configuration. It is to be understood that a multilateral well bore configuration includes at least two principal well bores connected by one or more ancillary well bores.

In one embodiment, a cement composition of the present invention may be used for plug and abandonment of a well, i.e. to prepare a well to be shut in and permanently isolated. A series of plugs comprising a cement composition of the present invention may be set in the well bore and tested at each stage for hydraulic isolation.

In another embodiment, a cement composition of the present invention may act as a spot fluid. A spot fluid herein refers to a small volume or pill of fluid placed in a well bore annulus that may displace another well bore servicing fluid such as for example a mud. The spot fluid may act as a settable fluid that when used will displace another well bore servicing fluid from a crack or crevice in the well bore and solidify to prevent flow of other well bore servicing fluids into said cracks or crevices.

By way of example, the cement compositions of the present invention may be placed into a well bore as a single stream and activated by downhole conditions to form a set rigid mass. In one embodiment, the cement compositions of the present invention may be placed downhole through the drill bit forming a composition that substantially eliminates lost circulation. In yet another embodiment, the cement compositions of the present invention may be formed downhole by the mixing of a first stream comprising one or more components such as for example MgO and chloride or phosphate salt and a second stream comprising additional components. Alternatively, the cement compositions of the present invention may be formed downhole by the mixing of a first stream comprising MgO and a second stream comprising the chloride or phosphate salt, retarder and optional additives. In yet another embodiment, the cement compositions of the present invention may be formed downhole by the mixing of a first stream comprising MgO, a chloride salt, and a non-aqueous solvent with a second stream comprising a source of water, for example a water based mud. Methods for introducing compositions into a well bore to seal subterranean zones are described in U.S. Pat. Nos. 5,913,364, 6,167,967, and 6,258,757, each of which is incorporated by reference herein in its entirety The cement compositions of the present invention may develop an appreciable compressive strength when placed downhole, in accordance with embodiments of the present invention. Herein the compressive strength is defined as the capacity of a material to withstand axially directed pushing forces. The maximum resistance of a material to an axial force is determined in accordance with API Recommended Practices 10B, 23rd edition, April 2002. Beyond the limit of the compressive strength, the material becomes irreversibly deformed and no longer provides structural support and/or zonal isolation. The compressive strength a set cement composition attains is a function of both the cement maturity (or cure time) and the temperature at which setting occurs. The cement maturity specifically refers to the time the cement composition is allowed to set.

In one embodiment, the cement compositions of the present invention may develop a compressive strength of from about 50 psi to about 20,000 psi, alternatively from about 100 psi to about 10,000 psi, alternatively from about 1,000 psi to about 5,000 psi. The compressive strength of an embodiment of a cement composition of the present invention may develop in from about 15 minutes to equal to or greater than about 24 hours, alternatively from about 20 minutes to about 10 hours, alternatively from about 30 minutes to about 8 hours. As will be understood by one of ordinary skill in the art, the compressive strength that develops is directly proportional to the ratio of Sorel cement to oleaginous fluid and/or water. Consequently, increasing the amount of Sorel cement present in the cement composition of the present invention will result in an increased final compressive strength of the set composition.

To facilitate a better understanding of the present invention, the following examples of certain aspects of some embodiments are given. In no way should the following examples be read to limit, or define, the entire scope of the invention.

Example 1

Test samples of cement slurries comprised of Sorel cements, a retarder, and fresh water or saltwater were prepared. Amine phosphono retarders in accordance with embodiments of the present invention were added to some of the test samples (Sample Nos. 3-7) and a comparative retarder was added to the other samples (Samples Nos. 1 and 2). The amine phosphono retarders in accordance with embodiments of the present invention, designated as "Dequest®-2006" (50% active) and "Dequest®-2054" (25% active) are commercially available from Thermphos Trading GmbH. The comparative retarder, designated as "R-Tek", comprised of sodium hexametaphosphate retarder, is commercially available from Deepearth Solutions. After sample preparation, the pump time tests were performed in accordance with API Recommended Practice for Testing Well Cements 10B, 23rd edition, April 2002.

The results of the tests are also set forth in Table I below.

TABLE I

Sorel Cement Slurries Formed With Various Retarder Compositions

| Slurry No. | MgO Type | Type of Retarder Used | Dose of Retarder % active | Temperature °F. | Time to Temperature min | Pump Time hr:min |
|---|---|---|---|---|---|---|
| 1 | ThermaTek HT | R-Tek | 7% | 284 | 60 | 0:57 |
| 2 | Microbond HT | R-Tek | 7% | 284 | 60 | 1:00 |
| 3 | ThermaTek HT | Dequest ® 2006 | 3.5% | 284 | 60 | 1:45 |
| 4 | ThermaTek HT | Dequest ® 2054 | 1.75% | 284 | 60 | 6:52 |
| 5 | Microbond HT | Dequest ® 2054 | 1.75% | 284 | 60 | 9:20 |
| 6 | Microbond HT | Dequest ® 2054 | 1.75% | 320 | 60 | 7:47 |
| 7 | Microbond HT | Dequest ® 2054 | 1.75% | 400 | 90 | 2:12 |

From Table I it can be seen that Sorel cement compositions comprising an amine phosphono retarder were able to achieve high pump times at temperatures up to 400° F. and longer pump times than conventional retarders at temperatures of 284° F.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing comprising:
   introducing a cement composition into a subterranean formation, wherein the cement composition comprises a Sorel cement and an amine phosphono retarder, wherein the Sorel cement comprises a metal oxide and a soluble salt, and wherein the metal oxide is present in the Sorel cement in an amount of from about 10% to about 75% by the combined weight of the metal oxide and the soluble salt; and
   allowing the cement composition to set.

2. The method of claim 1 wherein the amine phosphono retarder comprises a retarder described by at least one of the following formulae or a salt thereof:

$N(CH_2PO(OH)_2)_3;$ $((OH)_2POCH_2)_2N(CH_2)_nN(CH_2PO(OH)_2)_2;$ $((OH)_2POCH_2)_2N(CH_2)_nN(CH_2PO(OH)_2)_2;$ and $((OH)_2POCH_2)_2N(CH_2)_xN(CH_2PO(OH)_2)(CH_2)_yN(CH_2PO(OH)_2)_2,$ wherein n, x, and y are independently selectable from 1-10.

3. The method of claim 1 wherein the amine phosphono retarder comprises a polymer or oligomer of at least one compound described by at least one of the following formulae:

$\{-CH_2-CHN(CH_2PO(OH)_2)_2-\}$ and $\{-CH_2-CH_2NCH2PO(OH)_2-\}_x.$

4. The method of claim 1 wherein the amine phosphono retarder comprises a polymer with at least one hanging phosphonate group.

5. The method of claim 1 wherein the amine phosphono retarder comprises a poly vinyl phosphonate.

6. The method of claim 1 wherein the amine phosphono retarder is present in the cement composition in an amount of from about 0.25% to about 20% by weight of the Sorel cement.

7. The method of claim 1 wherein the Sorel cement further comprises water.

8. The method of claim 7 wherein the water is present in the Sorel cement in an amount in the range of about 10% to about 200% by weight of the metal oxide and soluble salt therein.

9. The method of claim 1 wherein the cement composition comprises a surfactant.

10. The method of claim 1 wherein the subterranean formation has a temperature of at least 400° F. or greater.

11. A method of retarding a set time of a cement composition comprising:
adding an amine phosphono retarder to a cement composition that comprises a Sorel cement, wherein the Sorel cement comprises a metal oxide and a soluble salt and wherein the metal oxide is present in the Sorel cement in an amount of from about 10% to about 75% by the combined weight of the metal oxide and the soluble salt.

12. The method of claim 11 wherein the amine phosphono retarder comprises a retarder described by at least one of the following formulae or a salt thereof:

$N(CH_2PO(OH)_2)_3$;

$((OH)_2POCH_2)_2N(CH_2)_nN(CH_2PO(OH)_2)_2$;

$((OH)_2POCH_2)_2N(CH_2)_nN(CH_2PO(OH)_2)_2$; and $((OH)_2POCH_2)_2N(CH_2)_xN(CH_2PO(OH)_2)(CH_2)_yN(CH_2PO(OH)_2)_2$, wherein n, x, and y are independently selectable from 1-10.

13. The method of claim 11 wherein the amine phosphono retarder comprises a polymer or oligomer of at least one compound described by at least one of the following formulae:

$\{-CH_2-CHN(CH_2PO(OH)_2)_2-\}_x$ $\{-CH_2-CH_2NCH2PO(OH)_2-\}_x$.

14. The method of claim 11 wherein the amine phosphono retarder comprises a polymer with at least one hanging phosphonate group.

15. The method of claim 11 wherein the amine phosphono retarder comprises a poly vinyl phosphonate.

16. The method of claim 11 wherein the amine phosphono retarder is present in the cement composition in an amount of from about 0.25% to about 20% by weight of the Sorel cement.

17. The method of claim 11 wherein the Sorel cement further comprises water.

18. The method of claim 17 wherein the water is present in the Sorel cement in an amount in the range of about 10% to about 200% by weight of the metal oxide and soluble salt therein.

19. The method of claim 11 wherein the cement composition comprises a surfactant.

20. A cement composition comprising a Sorel cement and an amine phosphono retarder, wherein the Sorel cement comprises a metal oxide and a soluble salt and wherein the metal oxide is present in the Sorel cement in an amount of from about 10% to about 75% by the combined weight of the metal oxide and the soluble salt.

* * * * *